Sept. 3, 1940.  J. H. TEAF  2,213,852
CONDENSER STATOR MOUNTING MEANS
Filed March 25, 1938
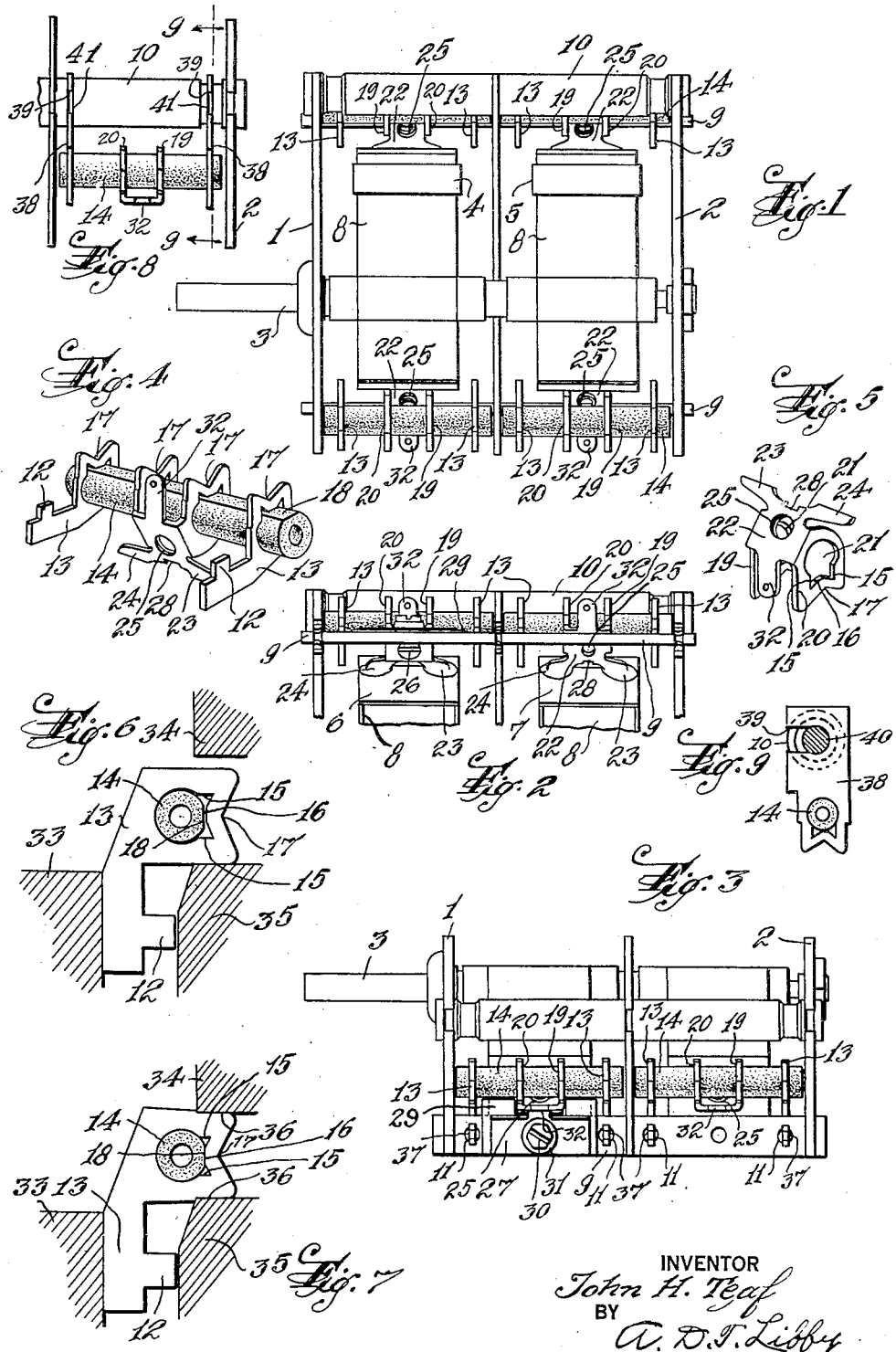
INVENTOR
John H. Teaf
BY
A. D. T. Libby
ATTORNEY Patented Sept. 3, 1940

2,213,852

UNITED STATES PATENT OFFICE 2,213,852

CONDENSER STATOR MOUNTING MEANS

John H. Teaf, Moorestown, N. J., assignor, by mesne assignments, to Condenser Development Corporation, Newark, N. J., a corporation of New Jersey Application March 25, 1938, Serial No. 197,999

10 Claims. (Cl. 175—41.5)

This invention relates to means for mounting the stator of a variable condenser.

It is the principal object of my invention to provide means for mounting the stator of a variable condenser so that the leakage from the stator to the frame is reduced to a very low value.

Another object of my invention is to provide an improved form of stator mounting which, while securing the principal object, is relatively cheap to manufacture and assemble.

These and other objects will be apparent to one skilled in this art on reading the following specification taken in connection with the annexed drawing, wherein:

Figure 1 is a plan view of a two-gang condenser showing my improved construction, one of the frame bars being omitted to show the parts below.

Figure 2 is a bottom view of one side of the gang condenser of Figure 1.

Figure 3 is a side elevation of Figure 1, but with the omitted frame bar of Figure 1.

Figure 4 is a perspective view of one of the units used for mounting the stators in the condenser frame.

Figure 5 is a perspective view of the bracket carried by the unit shown in Figure 4 and which is used for supporting the stator to the unit.

Figure 6 is a view of the initial operation in the assembly of the clamp and bracket members to form the unit shown in Figure 4.

Figure 7 is a view of the final assembly operation of the unit of Figure 4.

Figure 8 is a side elevation of a condenser unit showing a modified form of stator mounting.

Figure 9 is a section on the line 9—9 of Figure 8.

Referring now to the details wherein like numbers refer to corresponding parts in the various views, 1 and 2 are the end plates of a two-gang condenser which is used to illustrate the application of my improved form of stator mounting. The end plates 1 and 2 are held together by frame bars 9 and 10 on opposite sides of the shaft 3, carrying the usual rotor plates which, as illustrated, have end tie bars 4 and 5, while each stator is provided with oppositely disposed tie bars 6 and 7, to which the stator plates 8 are attached. A pair of units such as shown in Figure 4 are used for mounting each stator to the frame bars 9 which are, in the form of condenser shown, rectangular in shape and are provided with holes 11 to receive shouldered portions 12 of clamping members 13 which are identical in form, as shown on the enlarged view in Figure 6.

The clamp 13 is provided with a hole to receive the end of a rod 14 made of a suitable type of ceramic material. The peripheral wall of the hole in the clamp 13 has spaced notches 15, between which there is a substantially flat portion 16. The notches 15 are preferably V-shaped, with the apex of the V pointing toward opposite corners of the hole end of the clamp. The outer surface of the clamp, between the notches 15, is provided with an exterior notch or depression 17, the purpose of which will be hereinafter explained. Preferably, the ceramic rod 14 is provided with a longitudinal flat portion 18 adapted to cooperate with the flat portion 16 of the clamp 13.

The unit shown in Figure 4 carries between the two mounting clamps 13, a bracket having two side portions 19 and 20, each of which has a hole 21 corresponding to the hole in the clamps 13, and notches 15, a flat portion 16, and an exterior notch or depression 17, substantially identical with the formations on the clamps 13. The side members 19 and 20 of the brackets are connected by a yoke portion 22 which has fingers 23 and 24 extending rearwardly into cooperative position with one of the tie bars of the stator, for example 7, and these fingers 23 and 24 are soldered to their cooperating tie bar.

Furthermore, the yoke portion 22 is provided with a tapped hole 25 to receive a screw 26 which is used for fastening an extended portion of a trimmer plate 27 to the bracket. The extended portion of the trimmer plate passes inwardly over the frame bar 9 and between it and the lug 32 along the under surface of the yoke 22 which carries the screw 26. The bracket has a notch 28 to receive a finger of said extended portion of the trimmer plate which finger is bent into the notch to prevent the trimmer plate from turning or twisting out of position when the screw 26 is applied. The trimmer plate 27 extends over the frame bar 9 and is insulated therefrom by a suitable insulator, such as a piece of mica 29, an adjusting screw 30 and an insulator 31 being used in connection with the trimmer plate. It is to be understood, of course, that the trimmer plate may or may not be used, as desired. Extending from the yoke 22 of the bracket is a lug 32 for fastening a conductor thereto for completing a connection to the stator.

In the assembly of the bracket and the clamps 13 to the ceramic rod 14, the parts are held in a suitable fixture or tool 33, an end view of the assembly being shown in Figure 6, and the rod 14 slipped into place. Then punch members 34 and 35 are brought into simultaneous engagement with opposite edges of the clamps 13 and the side members 19 and 20 of the bracket, and the formation of these parts causes a toggle-like action to take place at the bottom of the depression 17, forcing the flat portions 16 of the various parts into gripping engagement with the flat surface 18 on the bar 14. The edges 36 (see Figure 7) are preferably squeezed beyond the point necessary to make the surface 16 engage the surface 18 of the bar, which action puts a "set" in the metal, thereby preventing any spring-back thereof, and securely anchoring the parts to the ceramic rod 14.

I have found that this rolling method of applying these parts to a ceramic rod will prevent breakage thereof, even though a heavy pressing action be applied to the opposite edges of the members as described. The depressed portions of the edges are indicated in the assembled view of Figure 4. This method of application of the parts of the rod is so efficacious that they can be mounted on a round rod, in which case the flat portion 16 would be made arcuate in form to grip the rod.

After the mounting unit has been assembled, as shown in Figure 4, it is applied to the frame by inserting the shouldered portions 12 into the holes 11 in the frame bars 9, and then the ends are staked over as indicated at 37, after which the stator is assembled into the frame and soldered to the fingers 23 and 24 as has been described.

In Figure 8 the stator mounting unit is provided with a clamp 38 which is somewhat differently shaped than the clamp 13 of Figure 4. In this form of construction, the clamp 38 is provided with a slot 39 which is adapted to span a reduced portion 40 of the frame rod 10, the width of the slot 39 being somewhat smaller than the diameter of the rod 40 so as to get a gripping engagement therewith. Furthermore, the thickness of the clamp 38 is such as to get a gripping engagement of the sides of the groove 41 on the rod 40 so that when the clamps 38 are forced into position in the groove 41 of the frame member 10, the clamps will be securely held therein. The attachment of the clamps 38 to the ceramic bar 14 is the same as has been described with respect to the clamps 13.

The ceramic members 14 shown in Figures 8 and 9 have no flats thereon, thereby showing how the clamps and stator bracket may be attached to a circular ceramic rod.

In the construction shown in Figure 8, the reenforcing frame bar member 27, shown in Figure 3, need not be used, and when the condenser is so made up the stators are attached to the frame members 10 as shown in Figure 8.

By this method of assembly of the parts to the ceramic insulation, I have eliminated the use of screws, pliable washers and clamps which have been used in the past to prevent breakage of the insulator, thereby greatly reducing the cost of manufacture and assembly of the stators into a condenser frame.

What I claim is:

1. A unit structure for mounting a condenser stator in a frame; said unit including a rod of ceramic material having a flat longitudinally positioned surface, a pair of metallic clamps each having a continuous walled hole to receive an end of said rod, the clamps being of relatively thin metal and positioned on the rod in a plane transverse thereto with the edges of the clamps engaging the rod, the material of the clamps forming part of the hole having a flat surface in inwardly-forced engagement with said flat surface on the rod and in permanent and fixed relation thereto, each clamp having an engaging portion for attachment to a frame member, a bracket having thin flat side members with rod-engaging formations similar to said clamps and fastened to said rod between said clamps in a manner similar to said clamps, the bracket having fingers for attachment to the stator, and a lug on said bracket for making electrical connection to the bracket.

2. A clamp for a mounting unit as set forth in claim 1, characterized in that the material around the hole has a pair of notches arcuately spaced on opposite sides of the flat surface of the clamps, so that portion having the flat surface is in said inwardly forced engagement with said flat surface on the rod through a toggle-like action by force applied to opposite edges of the clamp adjacent the notches.

3. A clamp for a mounting unit as defined herein comprising a flat metal stamping having an engaging portion for fastening the clamp to a frame support, the clamp having a hole to receive a bar having a flat surface thereon, the hole having in its periphery two spaced notches with a flat portion therebetween and the end of the clamp having an exterior depression located between the interior notches so when pressure is applied to the two edges adjacent the exterior depression the metal between the interior notches will be forced inwardly with a toggle-like action for the purpose described.

4. A bracket for a mounting unit as set forth in claim 1, characterized in that the bracket side members are joined by a yoke, each side member having a hole therein to receive the rod, the material around each hole being notched and having a flat surface between the notches, so that portion having the flat surface is in inwardly-forced engagement with said flat surface on the rod and in permanent and fixed relation thereto, by force applied to opposite edges of the side members.

5. A bracket for a mounting unit as set forth in claim 1, characterized in that the bracket side members are joined by a yoke, each side member having a hole therein slightly larger than the rod, the wall of the hole having a pair of arcuately spaced notches extending toward the free end of the side member, leaving a flat surface between the notches, in inwardly-forced engagement with said flat surface on the rod and in permanent and fixed relation thereto, while the attachment fingers extend from the yoke.

6. A bracket as defined in claim 1, further characterized in that the bracket has a pair of spaced side members joined by a yoke, and the yoke has a notch therein to receive a positioning tine on a plate which may be added to the bracket, the yoke having a threaded hole therein to fasten the plate to the bracket.

7. A unit structure for mounting a condenser stator in a frame; said unit including a ceramic bar having a metal part mounted thereon, said metallic part having thin spaced members for engaging the bar in edgewise relation and each member having a hole with continuous and unbroken walls through which said bar passes, the metal part being gripped to the bar by the material around said hole being permanently and initially swaged around the bar, said metal part having electrical attachment means, and further means for anchoring said bar to a support through metallic parts fastened to the bar in a manner similar to said metal part which has the electrical attachment means.

8. Means for supporting an electrical unit including a ceramic bar having a suitable metal part mounted thereon in edgewise relation and by means of a continuous walled hole through said part through which the bar passes, the material around the hole being sufficiently thin so it can be pinched in permanent and fixed relation around the bar by a swaging action whereby the said material is stretched into pinching position to prevent breakage of the bar, the metal part having means for making attachment to said electrical unit.

9. Means for supporting an electrical unit including a ceramic bar having a suitable metal part mounted thereon in edgewise relation and by means of a continuous walled hole through said part through which the bar passes, the material around the hole being sufficiently thin so it can be pinched in permanent and fixed relation around the bar by a swaging action whereby the said material is stretched into pinching position to prevent breakage of the bar, the metal part having means for making attachment to said electrical unit, the bar itself being supported by metallic means anchored to the bar in a manner similar to said metal part which supports the electrical unit.

10. The method of supporting an electrical unit by ceramic bars which consists in first forming relatively thin flat metallic members with holes therethrough such that the metal around the holes can be moved to give a toggle-like action to grip a bar without cracking it, passing a bar through the holes in said metallic members and locating said members in proper edgewise position on the bar, and then applying force to said metallic members to secure said toggle action on the metal and force the same around the bar without breaking it.

JOHN H. TEAF.